United States Patent [19]

Kesting

[11] 4,219,517

[45] Aug. 26, 1980

[54] PROCESS FOR SPINNING DENSE HOLLOW FIBER CELLULOSIC MEMBRANE

[75] Inventor: Robert E. Kesting, Irvine, Calif.

[73] Assignee: Puropore Inc., Tustin, Calif.

[21] Appl. No.: 950,664

[22] Filed: Oct. 12, 1978

[51] Int. Cl.$^2$ .................. B05D 3/00; D02G 3/22
[52] U.S. Cl. .................. 264/49; 210/500 M; 264/207; 264/209; 264/344; 428/398
[58] Field of Search .................. 264/49, 41, 207, 209; 106/176; 210/500 M, 321, 22, 23, 490; 428/398

[56] References Cited

U.S. PATENT DOCUMENTS

| | | | |
|---|---|---|---|
| Re. 19,329 | 9/1934 | Weingand | 264/178 |
| 1,707,164 | 3/1929 | Karplus | 264/188 |
| 1,864,006 | 6/1932 | Weingand | 264/188 |
| 1,969,468 | 8/1934 | Malm et al. | 260/101 |
| 2,348,305 | 5/1944 | Olpin et al. | 260/229 |
| 2,348,308 | 5/1944 | Olpin et al. | 260/229 |
| 2,809,192 | 10/1957 | Sloan et al. | 260/230 |
| 2,864,506 | 12/1958 | Hiskey | 210/321 |
| 3,031,328 | 4/1962 | Larsen | 117/36.7 |
| 3,228,876 | 1/1966 | Mahon | 210/22 |
| 3,228,877 | 1/1966 | Mahon | 210/22 |
| 3,373,056 | 3/1968 | Martin | 117/144 |
| 3,422,008 | 1/1969 | McLain | 210/22 |
| 3,423,491 | 1/1969 | McLain et al. | 264/49 |
| 3,450,650 | 6/1969 | Murata | 260/2.5 |
| 3,455,460 | 7/1969 | Mahon et al. | 210/321 |
| 3,475,331 | 10/1969 | McLain | 210/321 |
| 3,520,960 | 7/1970 | Douglas | 264/49 |
| 3,580,841 | 5/1971 | Cadotte et al. | 210/23 |
| 3,585,126 | 6/1971 | Cannon et al. | 210/23 |
| 3,592,671 | 7/1971 | Malm et al. | 106/176 |
| 3,615,024 | 10/1971 | Michaels | 210/490 |
| 3,653,180 | 4/1972 | Juliano et al. | 55/16 |
| 3,654,065 | 4/1972 | Dorogi | 161/159 |
| 3,655,591 | 4/1972 | Seiner | 260/2.5 M |
| 3,659,983 | 5/1972 | McLain et al. | 425/72 |
| 3,674,628 | 7/1972 | Fabre | 161/178 |
| 3,674,719 | 7/1972 | Jenkins | 260/2.5 M |
| 3,724,672 | 4/1973 | Leonard et al. | 210/500 M |
| 3,733,367 | 5/1973 | Perry et al. | 260/669 A |
| 3,755,034 | 8/1973 | Mahon et al. | 156/169 |
| 3,762,136 | 10/1973 | Kimura | 55/158 |
| 3,780,147 | 12/1973 | Stana | 264/49 |
| 3,781,378 | 12/1973 | Kantor et al. | 260/824 R |
| 3,792,135 | 2/1974 | Brown et al. | 264/41 |
| 3,798,185 | 3/1974 | Skiens et al. | 260/2.5 M |
| 3,799,356 | 3/1974 | Salyer | 210/500 M |
| 3,806,564 | 4/1974 | Riley et al. | 264/41 |
| 3,852,224 | 12/1974 | Bridgeford | 106/195 |
| 3,852,388 | 12/1974 | Kimura | 264/41 |
| 3,884,801 | 5/1975 | Kesting | 210/23 |
| 3,930,105 | 12/1975 | Christen et al. | 428/398 |
| 3,933,653 | 1/1976 | Hashino et al. | 210/500 M |
| 3,945,926 | 3/1976 | Kesting | 210/500 M |
| 3,957,651 | 5/1976 | Kesting | 210/490 |
| 4,035,457 | 7/1977 | Kesting | 264/41 |
| 4,035,459 | 7/1977 | Kesting | 264/49 |
| 4,048,271 | 9/1977 | Kesting | 264/41 |

FOREIGN PATENT DOCUMENTS

| | | |
|---|---|---|
| 568506 | 1/1959 | Canada . |
| 550259 | 4/1932 | Fed. Rep. of Germany . |
| 672220 | 12/1929 | France . |
| 717524 | 1/1932 | France . |
| 145979 | 6/1931 | Switzerland . |
| 148491 | 10/1931 | Switzerland . |
| 150789 | 2/1932 | Switzerland . |
| 150790 | 2/1932 | Switzerland . |
| 320842 | 10/1929 | United Kingdom . |
| 306132 | 4/1930 | United Kingdom . |

OTHER PUBLICATIONS

Francis et al., Research & Dev. Prog. Report, No. 177, Feb. 1966, pp. 37–39.

Cadotte et al., Applied Polymer Symposium, Membranes from Cellulose & Cel. Dera, J. Wiley & Sons, N.Y., 1970.

Izard et al., Indus. Eng. Chem., vol. 41, No. 3, pp. 617–621.

Malm et al., Ind. Eng. Chem., vol. 42, No. 8, pp. 1547–1550.

Vos et al., I & E C Product Res. & Dev., vol. 8, No. 1, pp. 84–89, Mar. 1969.

Dance et al., Research & Dev. Prog. Report, No. 763, Dec. 1971, pp. 1–35.

*Primary Examiner*—Jay H. Woo
*Attorney, Agent, or Firm*—Knobbe, Martens, Olson, Hubbard & Bear

[57] ABSTRACT

A dense hollow fiber cellulosic membrane which possesses outstanding permeability and strength characteristics and the method of preparation thereof is disclosed.

6 Claims, No Drawings

PROCESS FOR SPINNING DENSE HOLLOW FIBER CELLULOSIC MEMBRANE

BACKGROUND OF THE INVENTION

This invention relates to hollow fiber membranes and more particularly, to improved thin walled hollow fiber membranes suitable for hemodialysis, i.e., artificial kidney applications.

Kesting (1) incorporated herein by reference, describes many types of membranes and methods of preparation of the same. In Chapter 3, Kesting describes dense membranes and methods for their preparation giving various examples.

Cellulose acetate, cellulose triacetate and other cellulose ester and ether membranes are well known.

Gel spun hollow fiber membranes for dialysis have been described (2-7) and their applications are discussed in considerable detail by Mahon (3). Thick walled hollow fibers (not suitable for dialysis) but suitable for certain textile applications, have been prepared by dry spinning from acetone solutions. However, acetone is not a suitable solvent for producing thin walled fibers suitable for dialysis of the type of the disclosed invention.

One of the important applications of fiber membrane structures is in the field of dialysis. The cordis-Dow Corporation has produced a hollow fiber cellulosic membrane by a gel spinning process from a solution which contains cellulose acetate, Carbowaxes, i.e., polyethylene oxides, and the solvent sulfolane. This polymer melt is spun out into water and produces fibers with very poor physical properties due to the plasticizing action of the Carbowaxes. The resulting fibers are weak and possess comparatively poor transport properties. Thus, these fibers provide difficulties for subsequent handling and use in fiber handling equipment.

Enka-Glanzstoff produces a Cuprophan hollow cellulose fiber by a wet spinning process. Cellulose in the form of cotton linters and/or wood pulp is dissolved in a solution of cuprammonium hydroxide. This solution is then extruded into a salt bath and the cellulose is re-precipitated. This is a quite lengthy and involved process which involves dissolving and then re-precipitating the cellulose. In addition, the fiber cannot be dry spun but must be extruded into a salt bath.

U.S. Pat. No. 4,035,459 issued to the Applicant discloses asymmetric or skinned membranes which have a skin on the inside surface of the hollow fiber because of the action of a non-solvent which is injected into the fiber core. These porous phase-inversion membranes are produced from a spinning solution which includes a pore-producing nonsolvent. By means of the dry phase-inversion process two interdispersed liquid phases are formed and the nonsolvent evaporates from the polymer fiber leaving voids or pores. As this dry phase-inversion process is taking place, a core liquid is injected into the core of the fiber resulting in the formation of a skin on the inner surface of the fiber. However, the use of an asymmetric membrane of this type requires an undesirably high ultrafiltration rate in order to obtain the desired solute clearances.

The hollow fibers of the present invention are comparatively dense membranes as opposed to porous phase-inversion membranes. The preparation of dense membranes from polymer solutions entails complete solvent evaporation, whereas solutions which are to result in phase inversion membranes are not allowed to evaporate to dryness before their structure is set. These membranes therefore do not depend on phase inversion processes for their production.

The disclosed invention obviates the difficulties in the prior methods by producing thin walled hollow fiber membranes suitable for dialysis which can be dry spun and possess increased solute clearances and excellent strength. High solute clearance of the membrane coupled with a low ultrafiltration rate is extremely important in such applications as kidney dialysis. The disclosed membranes thus provide excellent transport properties without a reduction in structural integrity. The disclosed dense film fibers can also be produced an order of magnitude faster than those disclosed in U.S. Pat. No. 4,035,459 and are therefore extremely economical.

It has long been established that the nature of the solvent mixture from which a dense polymeric membrane is formed has an important influence on the physical, mechanical and permeability properties obtained (1) (citation omitted). Applicant has discovered that the pore producing nonsolvent can be eliminated from the spinning mixture. The critical ingredient is an extender which after removal increases the permeability of the membrane without a decrease in structural strength thereby producing a membrane which possesses a low ultrafiltration rate together with high solute clearances and yet possesses the strength to withstand subsequent handling on textile machinery.

SUMMARY OF THE INVENTION

The present invention represents the first highly permeable thin walled dense hollow fiber membrane suitable for dialysis which is formed by dry spinning a polymer solution.

This membrane is formed by dry spinning a hollow fiber from a solution which includes cellulose acetate, a highly volatile solvent for that polymer, and an oligosaccharide ester extender(s) such as sucrose acetate isobutyrate or sucrose octoacetate. The solvent is evaporated from the hollow fiber through exposure to the atmosphere. The hollow fiber membrane is then hydrolyzed in a methanolic sodium hydroxide solution. The methanol removes the oligosaccharide ester(s) thereby producing a permeable comparatively dense membrane without a decrease in the structural properties of the cellulose acetate.

DESCRIPTION OF THE PREFERRED EMBODIMENTS

The process of the invention comprises extruding a hollow fiber from a spinning solution into an atmosphere conducive to evaporation. The spinning solution is filtered and dry spun through a spinerette consisting of an outer orifice through which the solution flows and an inner hollow needle through which gas is injected to prevent the fiber from collapsing upon itself. An apparatus generally of the type shown in McLain et al (6) may be used.

The spinning solution includes the cellulose acetate polymer, e.g., Eastman E-394-30, Eastman E-394-45, Eastman E-383-40, Eastman E-400-25 or Hercules M-203 Grade Cellulose Acetate.

The second constituent is a solvent. The only satisfactory solvents are methyl formate and propylene oxide, with ethylene oxide being only very marginally usable. The preferred solvents are methyl formate and propylene oxide. These two solvents are the only strong solvents for cellulose acetate which boil within 10° C. of ambient temperature and which are fully satisfactory for the present system.

The third constituent is the extender which is an oligosaccharide ester such as sucrose acetate isobutyrate or sucrose octoacetate. This constituent is important in that it increases the permeability of the post hydrolysis fiber without reducing its strength.

The use of oligosaccharide as an extender in the manufacture of hollow fibers suitable for dialysis is an independently inventive aspect and has application in the gel and wet spinning processes as well as dry spinning. In the gel and wet spinning processes the spinning solution would include cellulose acetate (which excludes the Cuprophan membrane whose spinning solution contains cellulose), a nonvolatile solvent such as sulfolane and the oligosaccharide ester. The solvent would therefore not be lost by evaporation into the atmosphere but into the bath. Greater detail of the gel and wet spinning processes which is not of prime concern for the present invention is given in Mahon (3) and Bandel (7) respectively which are herein incorporated by reference.

The percentage ranges of these constituents in the spinning solution are not critical and vary depending upon the exact physical and transport properties which are desired. For example, the more extender which is added, the greater will be the permeability of the resulting membrane. The viscosity of the spinning solution as a whole is a more important parameter and should be in the range of 50,000 to 100,000 centipoises. 70,000 to 90,000 is preferred. As the hollow fiber is extruded and formed, the solvent i.e., methyl formate or propylene oxide, evaporates from the membrane.

The hollow fiber membrane should then be hydrolyzed by a methanolic caustic solution to convert cellulose acetate to cellulose and to remove the oligosaccharide ester. This procedure produces a permeable dialysis membrane.

The finished hollow fiber is hydrolyzed by positioning the fiber into an artificial kidney element and then circulating through the fiber lumen a methanolic sodium hydroxide solution. A satisfactory solution has been found to be 0.1 M. This solution is circulated for about a half an hour. About 20% glycerine may be added to this solution to prevent the fiber from shrinking as a result of the hydrolysis. The sodium hydroxide serves as the hydrolyzing agent, while the methanol serves to leach out the oligosaccharide ester. Of course, the hydrolysis and leaching step may be conducted separately if desired.

The fiber is then washed successively with isopropyl alcohol containing acetic acid and glycerine and then finally washed with isopropyl alcohol containing glycerine and blown dry.

The invention encompasses both the process and the product and the scope of the invention is not limited to the following examples which are given as illustration only.

TABLE I

| Fiber Type | Plasticizer or Extender | Tensile Strength (psi $\times 10^{-4}$) | Tensile Modulus (psi $\times 10^{-5}$) |
|---|---|---|---|
| Cellulose vs. Cellulose Acetate | | | |
| (1) Cupraphan ® (cellulose) | — | 3.04 ± 0.10 | 7.85 ± 1.88 |
| (1A) Cordis-Dow | — | ~0.03 | ~2.60 |
| (2) Cellulose Acetate (Run 93) (No-SAIB) | — | 3.00 ± 0.29 | 6.53 ± 0.82 |
| Plasticizers vs. SAIB Extender | | | |
| (3) Cellulose Acetate | 16% Carbowax ® 400 | 1.49 | 3.58 |
| (4) Cellulose Acetate | 16% Carbowax ® 600 | 0.93 | 3.14 |
| (5) Cellulose Acetate | 16% triacetin | 2.25 | 5.78 |
| (6) Cellulose Acetate | 16% SAIB (sucrose acetate isobutyrate) | 2.69 | 6.26 |

Examples (1) and (1A) represent Cuprophan and Cordis-Dow dialysis fibers, respectively. Example (2) is a fiber similar to the present invention but lacking the oligosaccharide extender and therefore possesses low permeability. Examples (3)–(5) represent fiber formed from a spinning solution which includes cellulose acetate and conventional extenders such as Carbowax and triacetin. Example (6) is representative of the present invention.

These data in Table I indicate that there is virtually no difference between the physical properties of Cuprophan (1) which is a cuprammonium regenerated cellulose and those of dense cellulose acetate (2) or cellulose acetate extended by SAIB (6). On the other hand, the physical properties of cellulose acetate fibers containing the usual plasticizers (3–5) are severely reduced as are the physical properties of the Cordis-Dow cellulose fibers (1A) also made from cellulose acetate/Carbowax formulations.

The precise formulation of example (6) would be sufficient cellulose acetate type Eastman E-394-60 or type Eastman E-383-40 to make a viscosity of 80,000 centipoises, a solvent of propylene oxide and 16% by weight total nonvolatiles of the sucrose acetate isobutyrate extender.

TABLE II

| Example | Run # | Unit # | Ave. Wall thickness (microns) | Ultrafiltration rate (cm/hr mm Hg $\times 10^{-4}$) | Vitamin B12 dialysis permeability (cm/min $\times 10^{-3}$) | Urea Dialysis permeability (cm/min $\times 10^{-3}$) |
|---|---|---|---|---|---|---|
| (7) | 66 | Cup-2 | 11 | 3.2 | 3.45 | 37.7 |
| (8) | 66 | Cup-3 | 11 | 3.3 | 3.50 | 36.6 |
| (9) | 67 | Cup-4 | 11 | 3.2 | 3.23 | 33.7 |

TABLE II-continued

| Example | Run # | Unit # | Ave. Wall thickness (microns) | Ultrafiltration rate (cm/hr mm Hg $\times 10^{-4}$) | Vitamin B12 dialysis permeability (cm/min $\times 10^{-3}$) | Urea Dialysis permeability (cm/min $\times 10^{-3}$) |
|---|---|---|---|---|---|---|
| (10) | 65 | 87-3-2 | 15.0 | 2.0 | 1.98 | 25.8 |
| (11) | 64 | 87-3-1 | 15.5 | 3.1 | 2.93 | 26.8 |
| (12) | 62 | 87-2-4 | 14.7 | 3.3 | 3.39 | 26.7 |
| (13) | 61 | 87-2-2 | 14.7 | 4.1 | 3.82 | 26.3 |
| (14) | 69 | 87-4-1 | 14.7 | 5.3 | 4.18 | 28.6 |
| (15) | 68 | 87-3-4 | 15.7 | 6.8 | 4.41 | 28.7 |

Table II illustrates the comparable permeability properties of the present invention (10–15) as compared with Cuprophan (7–9). The ultrafiltration rate of the disclosed membrane is comparable to that of Cuprophan as is the membrane's dialysis permeability to large solutes such as Vitamin B-12 and Urea.

REFERENCES CITED IN THE SPECIFICATION (1) Kesting, R. E., SYNTHETIC POLYMERIC MEMBRANES, McGraw-Hill, New York, 1971.
(2) Hiskey, C. F., U.S. Pat. No. 2,864,506.
(3) Mahon, H. I., U.S. Pat. No. 3,228,876.
(4) McLain, E. A., et al, U.S. Pat. No. 3,423,491.
(5) McLain, E. A., U.S. Pat. No. 3,422,008.
(6) McLain, E. A., et al, U.S. Pat. No. 3,659,983.
(7) Bandel, Werner, "Developments in the Field of Cuprophan Membranes and Hollow Fibers," delivered at the 7th Working Session of the Working Group for Clinical Nephrology, Hamburg, Germany, June 14, 1974 (Enka-Glanstoff, A. G., Wuppertal-Barman, Germany).

I claim as my invention:

1. A process for forming a dense hollow fiber membrane comprising the steps of:
    (a) spinning a thin walled hollow fiber suitable for dialysis from a solution which in turn comprises:
        (i) cellulose acetate;
        (ii) a solvent for said polymer;
        (iii) an oligosaccharide ester.
    (b) hydrolyzing the cellulose acetate to cellulose, and
    (c) removing the oligosaccharide ester by leaching.

2. The process of claim 1 wherein the spinning step is dry and the solvent is highly volatile so that it will evaporate from the hollow fiber.

3. The process of claim 1 wherein the oligosaccharide ester is sucrose acetate isobutyrate or sucrose octoacetate.

4. The process of claim 2 wherin the oligosaccharide ester is sucrose acetate isobutyrate or sucrose octoacetate.

5. The process of claim 4 wherein the solvent is methyl formate or propylene oxide.

6. The process as defined in claim 2 wherein the solution is of a viscosity of 50,000 to 100,000 centipoises.

* * * * *

UNITED STATES PATENT AND TRADEMARK OFFICE
CERTIFICATE OF CORRECTION

PATENT NO. : 4,219,517
DATED      : August 26, 1980
INVENTOR(S) : Robert E. Kesting It is certified that error appears in the above-identified patent and that said Letters Patent are hereby corrected as shown below:

Column 1, line 27, change "cordis" to --Cordis--.

Column 2, line 62, after "e.g.", insert --E-394-60--.

Signed and Sealed this

Sixteenth Day of December 1980

[SEAL]

Attest:

SIDNEY A. DIAMOND

*Attesting Officer*     *Commissioner of Patents and Trademarks*